(No Model.) 4 Sheets—Sheet 1.

T. H. WARD.
DIFFERENTIAL PULLEY BLOCK.

No. 336,364. Patented Feb. 16, 1886.

Witnesses:
George E. Sibson
Harry Drury

Inventor:
T. H. Ward
by his attys.
Howson & Son (No Model.) 4 Sheets—Sheet 2.

T. H. WARD.
DIFFERENTIAL PULLEY BLOCK.

No. 336,364. Patented Feb. 16, 1886.

Witnesses:
George E. Sibson
Harry Drury

Inventor:
T. H. Ward
by his Attys
Howson & Snip (No Model.) 4 Sheets—Sheet 3.

T. H. WARD.
DIFFERENTIAL PULLEY BLOCK.

No. 336,364. Patented Feb. 16, 1886.

Witnesses:
George E. Gibson
Harry Drury

Inventor:
T. H. Ward
by his Attorney
Howson & Son (No Model.) 4 Sheets—Sheet 4.
T. H. WARD.
DIFFERENTIAL PULLEY BLOCK.

No. 336,364. Patented Feb. 16, 1886.

Witnesses:
George E. Sibson
Harry Drury

Inventor:
T. H. Ward
by his Attys.
Howson & Snip

UNITED STATES PATENT OFFICE.

THOMAS HENRY WARD, OF TIPTON, COUNTY OF STAFFORD, ENGLAND.

DIFFERENTIAL PULLEY-BLOCK.

SPECIFICATION forming part of Letters Patent No. 336,364, dated February 16, 1886.

Application filed July 2, 1885. Serial No. 170,524. (No model.) Patented in England August 26, 1884, No. 11,672.

*To all whom it may concern:*

Be it known that I, THOMAS HENRY WARD, a subject of the Queen of Great Britain and Ireland, and a member of the firm of Lee, Howl, Ward, & Howl, engineers, of Tipton, in the county of Stafford, England, have invented certain new and useful Improvements in Differential Pulley - Blocks or Hoisting-Gear, (for which I have obtained patent in Great Britain, No. 11,672, dated August 26, 1884,) of which the following is a specification.

My invention has reference to differential pulley - blocks (such as those known as "Weston's differential pulley-blocks,") or like hoisting apparatus—such, for example, as differential hoisting-gear for cranes—and has for one of its objects to provide an efficient and cheap arrangement upon the principle of being non-self-sustained, described in the specification of Letters Patent No. 268,323, dated November 28, 1882. It is not confined, however, in its application to apparatus constructed upon the principle of being non self-sustained; but I will first describe it as so applied, and afterward I will explain the modifications necessary to fit it for application to apparatus not constructed upon this principle.

Figure 1:
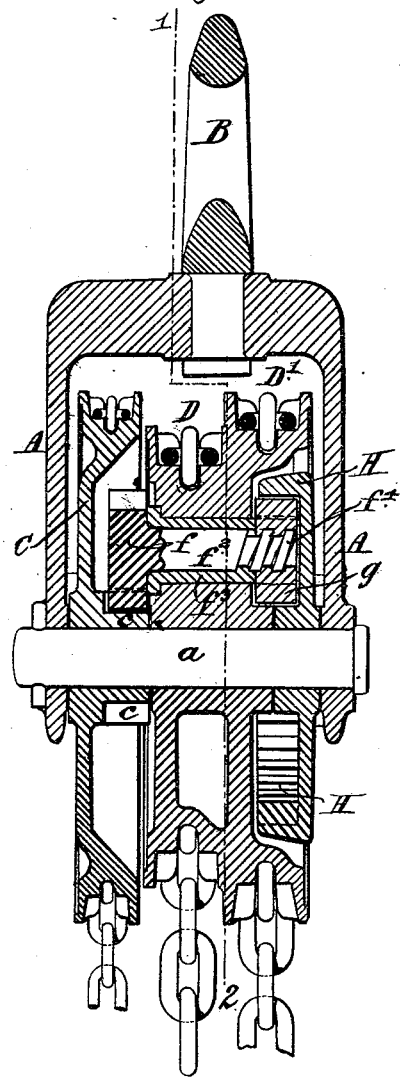
Figure 2:
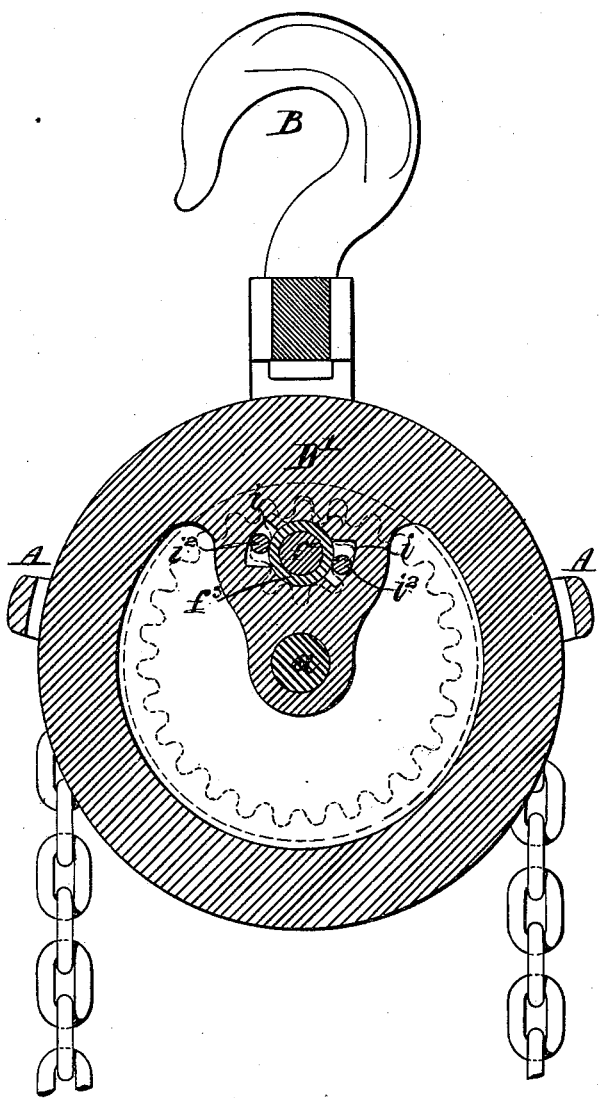
Figure 4:
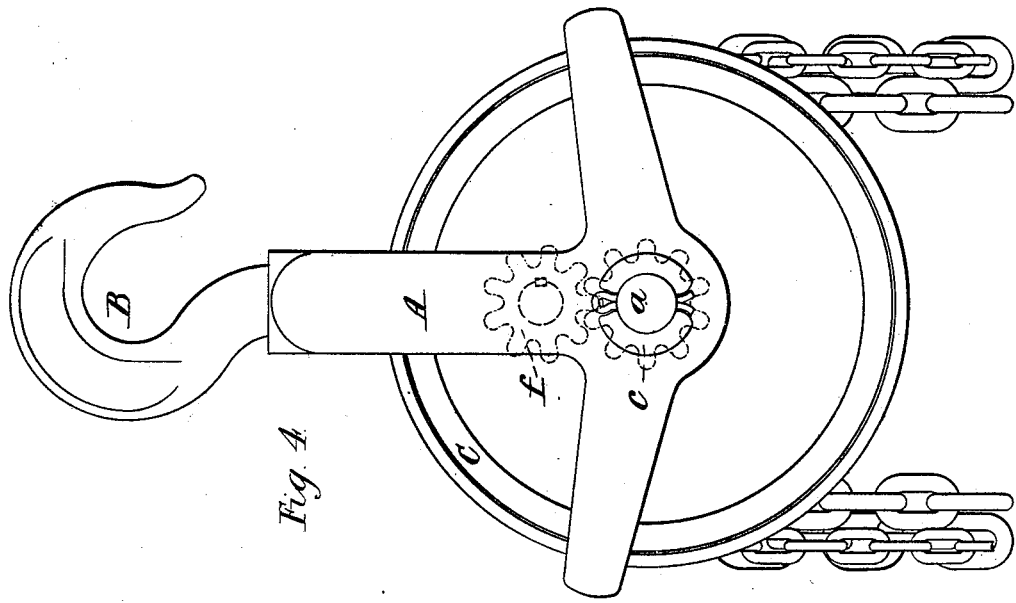
Figure 3:
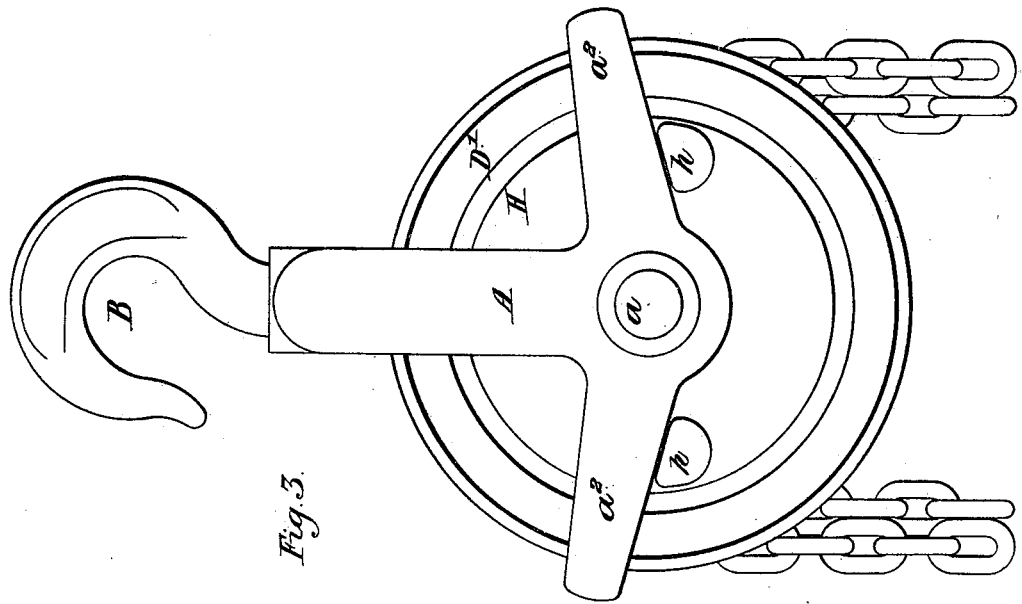

Figure 1 represents in vertical section an apparatus constructed according to my present invention; and Fig. 2 is a section on the line 1 2, Fig. 1. Figs. 3 and 4 are external views of opposite sides.

The framing A is preferably cast in one piece, and carries the hook or shackle B, or other means by which the block is suspended or attached to the place where it is to be used. The said frame also carries a fixed axis or shaft, $a$, upon which are mounted to turn a sprocket or hand wheel, C, and the differential sheaves D D' of the pulley-block, which are in this case proportioned so as to be non-self - sustained. The sprocket or hand wheel C has formed upon its boss or otherwise fixed to it or in connection with it a pinion, $c$, with which is geared a wheel, $f$, fast upon a short shaft, $f^2$, mounted in and passing through the differential sheaves D D' at a distance from the main shaft $a$, upon which the said sheaves turn, a sleeve piece or bush, $f^3$, intervening between the shaft $f^2$ and the hole in the said differential sheaves in which it is mounted. The said shaft $f^2$, at the end opposite to that on which the wheel $f$ is fixed, is screwed, and upon this screw ($f^4$) is mounted a pinion, $g$, which gears with an internally-toothed ring or circular rack, H, fixed to the main shaft $a$ of the framing or otherwise, so that the said toothed ring or rack H is not capable of rotating. As shown in the drawings, it is mounted on the shaft $a$, but is held in position by the projections $h$, which bear against the projections $a^2$ of the framing A, as shown in Fig. 3. In the sides of the hole which contains the sleeve or bush $f^3$ is or are a wedge-shaped recess or recesses, $i$, (I have shown two in the drawings, see Fig. 2,) gradually deepening in the direction of movement of the shaft $f^2$ in winding up a load, and containing a roller, $i^2$, which, when the sleeve or bush $f^3$ turns in the direction of winding up a load, is by the movement of the bush moved toward the deep end of the recess $i$ and leaves the bush $f^3$ free, but which, when the bush is moved in the reverse direction, is moved toward the shallow end of the recess $i$ and binds the bush $f^3$ to the differential sheaves D D'. The pinion $g$ upon the screwed end of the shaft $f^2$, when the said shaft is rotated in the direction of winding up a load, is caused by the screw $f^4$ to press upon the end of the sleeve or bush $f^3$, which in its turn is pressed upon the wheel $f$ at the other end, (or upon a collar or projection on the shaft $f^2$,) and the pinions $f$ and $g$, shaft $f^2$, and bush $f^3$ are all bound so as to move as one. The bush $f^3$ during this movement is free to turn in its bearing in the differential sheaves, and therefore the pinion $g$ is revolved round the stationary internally-toothed ring or circular rack H, and the differential sheaves D D' are rotated around the main shaft $a$. Whenever the hauling is discontinued, the load is sustained, as hereinafter described.

When the reverse or lowering movement is given in lowering the load, the short shaft $f^2$ is screwed out of the pinion $g$, the bush $f^3$ being held firmly by the aforesaid gripping arrangement between itself and the differential sheaves D D', (the recesses $i$ and rollers $i^2$.) The said pinion $g$ is thereby loosened from its grip on the end of the bush $f^3$, whereby the differential sheaves are allowed to turn under the weight of the load.

Whenever the raising or lowering is discontinued, the load will remain suspended, as the pinion $g$ will run on the screw $f^4$, so as to grip the bush $f^3$, and the said bush will turn partially until the rollers $i^2$ wedge themselves between the said bush and the recesses $i$ in the differential sheaves, and so the short shaft $f^2$ cannot revolve, and the load is held suspended.

Although I have described the recesses and rollers as the means for giving adhesion in one direction, it will be evident that a pawl detent or click and ratchet-wheel or equivalent arrangement may be used.

Figure 5:
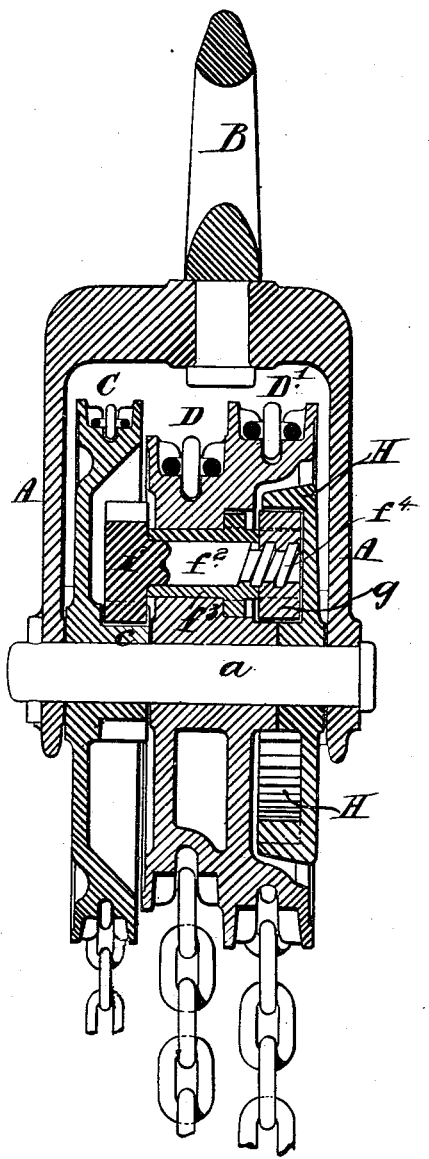
Figure 6:
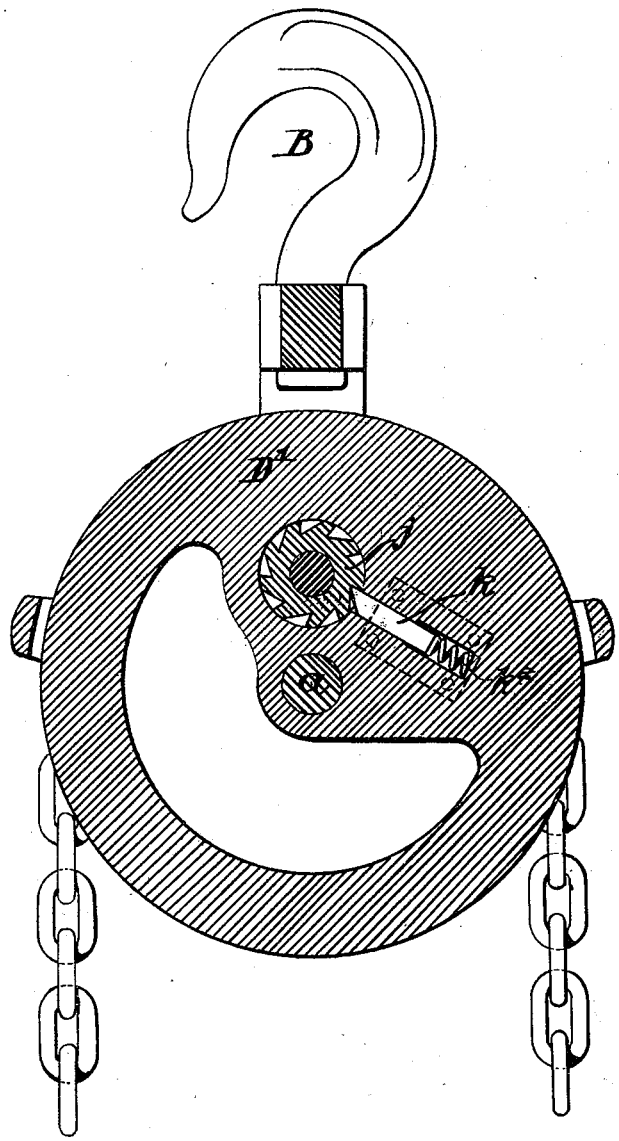

Figs. 5 and 6 are sections corresponding to Figs. 1 and 2, showing a ratchet-wheel, $j$, and detent or click $k$ in place of the recesses and rollers. The other parts are marked with the same letters of reference as those used to indicate the same parts in Figs. 1 and 2.

The ratchet-wheel is formed on the bush $f^3$, and the detent or click $k$ is situated in a recess in the differential sheaves, and is pressed outward by a spring, $k^2$. By reference to Fig. 6 it will be clearly seen that the detent or click acts as a retaining device in substantially the same way as do the rollers $i^2$.

The sheaves, when proportioned as a non-self-sustained pulley-block, and described in the Letters Patent No. 268,323, above referred to, should be of relative diameters as near a balance as is consistent with the sheaves being non-self-sustained, in order that the effort of gravity tending to lower may be as slight as possible, thus avoiding excessive strains on the lowering-gear.

Although I have described the differential sheaves as being proportioned so as to be non-self-sustained, yet they may be proportioned so as to be self-sustained, in which case the sustaining parts—namely, the sleeve $f^3$ and frictional rollers or their equivalent and the screw $f^4$ on the short shaft—are dispensed with, the pinion $g$, instead of being mounted on a screw, being fixed or keyed to or formed in one with the shaft $f^2$. In this case of course lowering will be effected by the power applied, in place of by gravity.

Figure 7:
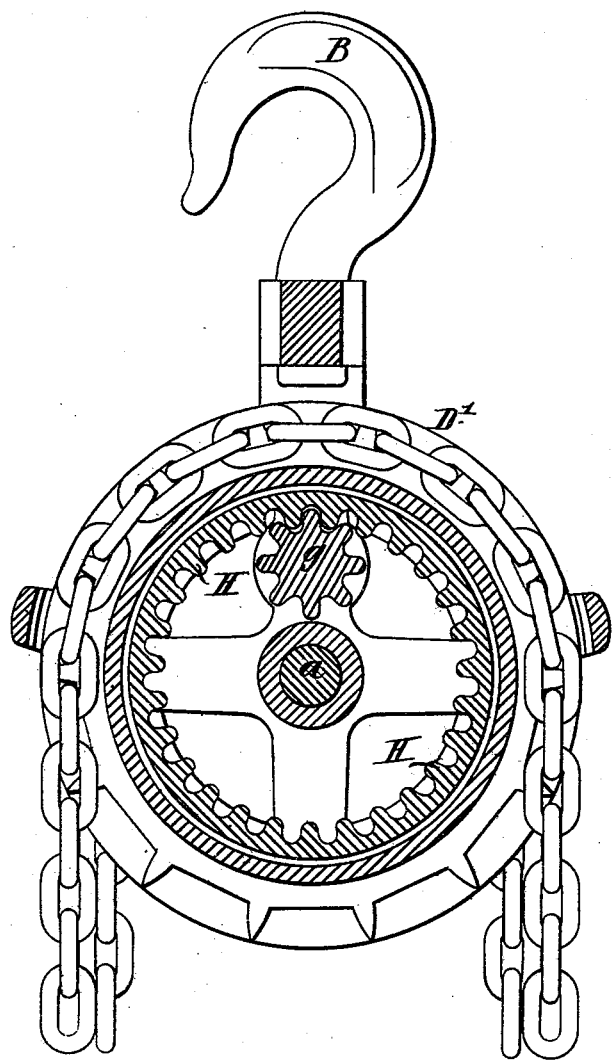
Figure 8:
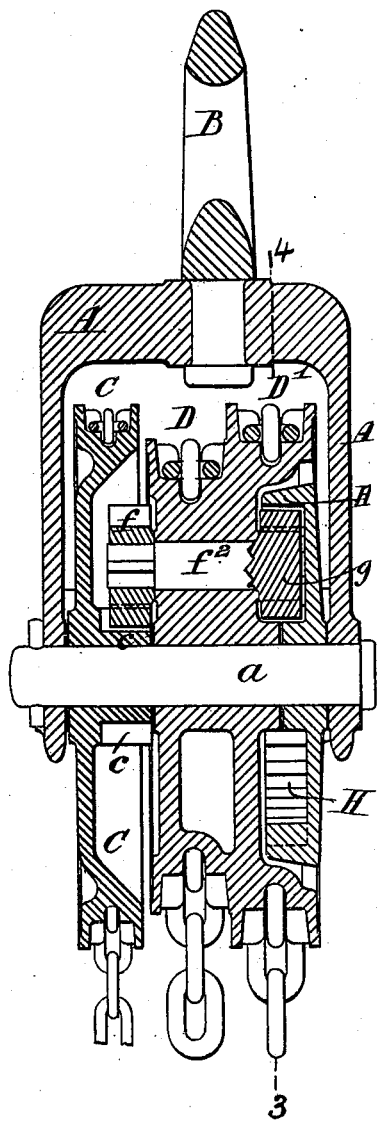

Figs. 7 and 8 represent the mechanism as arranged to be self-sustained, the views here shown being sections at right angles to each other, the section Fig. 7 being taken on the line 3 and 4, Fig. 8, and the parts being marked with the same letters of reference as those used to indicate the same parts in the other figures. In this case it will be seen that the shaft $f^2$ has fixed to it both the wheels or pinions $f$ and $g$, and passes through the hole or bearing in the differential sheaves without the necessity for the intervention of a bush, $f^3$. This arrangement possesses, in common with the preceding, the advantages of the parts being all compactly situated within the framing, the diameter of sprocket-wheel necessary for this arrangement permitting of its placement within the framing, which gives a more advantageous pull upon the hauling-chain, which pull in ordinary apparatus, with large sprocket-wheels arranged outside the framing, tends to deflect the apparatus when in use.

I claim as my invention—

1. The combination of the differential sheaves of a pulley-block or hoisting-gear and a wheel to which the power is applied, with a stationary internally-toothed rack and a shaft having its bearing in and passing through the said differential sheaves, the said shaft being provided at one end with a gear engaging with a pinion which turns with the said power-wheel, and at the other end with a gear engaging with said stationary rack, substantially as set forth.

2. The combination of the differential sheaves of a pulley-block or hoisting-gear, a wheel to which the power is applied, and a stationary rack, with a shaft passing through the sheaves and geared at one end to the power-wheel and at the other end to the said rack, a sleeve on the shaft, and a retaining device for the sleeve, the said shaft being screwed to receive one of the gear-wheels, all substantially as set forth.

3. The combination of the differential sheaves of a pulley-block or hoisting-gear with a power-wheel on one side and a circular rack on the other side of the sheaves, and a shaft having its bearings in the said differential sheaves and gearing at one side into the power-wheel and at the other into the circular rack, all substantially as described.

In testimony whereof I have signed my name to this specification in the presence of two subscribing witnesses.

THOMAS HENRY WARD.

Witnesses:
  CHAS. MILLS,
  CHAS. JAS. JONES,
    Both of 47 Lincoln's Inn Fields.